(12) United States Patent
Bridgewater et al.

(10) Patent No.: US 12,302,881 B2
(45) Date of Patent: May 20, 2025

(54) FISHING RIG STORAGE DEVICE

(71) Applicants: David Brian Bridgewater, Enterprice (CA); Troy Stephen Loader, Plainfield (CA)

(72) Inventors: David Brian Bridgewater, Enterprice (CA); Troy Stephen Loader, Plainfield (CA)

(73) Assignees: David Brian Bridgewater, Ontario (CA); Troy Stephen Loader, Ontario (CA)

( * ) Notice: Subject to any disclaimer, the term of this patent is extended or adjusted under 35 U.S.C. 154(b) by 26 days.

(21) Appl. No.: 18/466,146

(22) Filed: Sep. 13, 2023

(65) Prior Publication Data

US 2025/0081956 A1    Mar. 13, 2025

(51) Int. Cl.
*A01K 97/06*    (2006.01)

(52) U.S. Cl.
CPC ..................... *A01K 97/06* (2013.01)

(58) Field of Classification Search
CPC .............................. A01K 97/06; A01K 87/009
See application file for complete search history.

(56) References Cited

U.S. PATENT DOCUMENTS

| | | | |
|---|---|---|---|
| 566,595 A * | 8/1896 | Magnuson | ............. A01K 97/06 43/57.2 |
| 952,314 A | 3/1910 | Ellsworth | |
| 1,669,928 A | 5/1928 | Case | |
| 1,999,779 A | 4/1935 | Perrine | |
| 2,208,649 A | 7/1940 | Strom | |
| 2,533,865 A | 12/1950 | Wynne et al. | |
| 2,566,388 A * | 9/1951 | Waggoner | ............. A01K 97/06 43/57.2 |
| 2,724,208 A | 11/1955 | Nelson | |
| 2,760,296 A * | 8/1956 | Faul | ............. A01K 97/06 43/57.2 |
| 3,346,313 A | 10/1967 | Fee | |
| 3,797,161 A | 3/1974 | Smallwood | |
| 4,020,584 A * | 5/1977 | Michal | ............. A01K 97/06 43/57.1 |
| 4,040,202 A * | 8/1977 | Wille | ............. A01K 97/06 D3/905 |
| 4,653,220 A | 3/1987 | Olsen | |

(Continued)

*Primary Examiner* — Richard G Davis
(74) *Attorney, Agent, or Firm* — Argus Intellectual Enterprise, LLC; Jordan Sworen; Daniel Enea

(57) ABSTRACT

A device for organizing and storing pre-set fishing rigs. The storage device includes a housing having an upper cover and lower cover pivotally secured to a middle section. A first compartment is formed from the upper cover and middle section, whereas a second compartment is formed from the lower cover and middle section. The first and second compartments are disposed in a stacked configuration to allow for compact storing of multiple assembled fishing rigs. A plurality of eyelet fasteners is disposed at a first end of the first compartment and a plurality of tensioning member are disposed at a second end, aligned with the eyelet fasteners. A retaining member is positioned between the first and second ends of the compartment and can receive a fishing hook. The present invention allows pre-set lure combinations to be assembled and properly stored such that each fishing rig is ready for use while fishing.

17 Claims, 4 Drawing Sheets

(56) References Cited

U.S. PATENT DOCUMENTS

| | | | |
|---|---|---|---|
| 4,691,471 A * | 9/1987 | Hansen | A01K 97/06 43/57.2 |
| 5,269,090 A * | 12/1993 | Richards | A01K 97/06 43/57.2 |
| 5,386,662 A * | 2/1995 | Vader | A01K 97/06 206/315.11 |
| 8,468,740 B1 | 6/2013 | Ryckman | |
| 2016/0205913 A1 | 7/2016 | Aston et al. | |

* cited by examiner

FISHING RIG STORAGE DEVICE

BACKGROUND OF THE INVENTION

The present invention relates to a systems for storing fishing equipment. More specifically, the present invention provides a device for storing a plurality of assembled fishing rigs in an organized manner, ready for use.

Fishing enthusiasts often encounter significant challenges associated with disassembled and improperly stored fishing rigs. Traditional methods of rig organization involve storing disassembled lures and leaders in various containers, leading to several issues that negatively impact the fishing experience. Carrying multiple boxes or containers filled with disassembled lures and leaders makes it challenging to find the specific fishing rig needed for a particular fishing situation. This disorganization leads to fumbling around, searching for the right gear, and can disrupt the flow of fishing.

Setting up fishing rigs from scratch during each fishing trip can be a time-consuming process. Anglers typically spend valuable minutes tying knots, assembling leaders, and connecting lures before they can start fishing. This repetitive setup ritual not only wastes time but also takes away from the actual fishing activity. Furthermore, when fishing rigs are disassembled and stored haphazardly, the fishing lines are prone to tangling and kinking. Untangling these knots and kinks becomes a tedious and frustrating task for anglers. The time spent on detangling lines further reduces the time available for actual fishing, leading to decreased enjoyment and potentially missed opportunities.

Traditional methods of storing fishing rigs may involve using additional hardware like swivels or connectors, which can impede the natural action of the lure. These added elements may alter the lure's movement, potentially affecting its ability to attract fish effectively.

Safety also becomes a concern with improperly stored fishing rigs, which can result in sharp hooks being exposed, increasing the risk of accidental injuries during the handling and retrieval of fishing gear.

Given these challenges and drawbacks, there exists a need for an innovative fishing rig storage device that addresses these issues and provides a more efficient, organized, and tangle-free solution. The present invention aims to overcome the limitations of conventional fishing rig storage methods by offering a dual compartment storage device that pre-sets lure and leader combinations, keeps lines under tension to prevent tangling, ensures easy access to lures, maintains a direct connection without additional hardware, and eliminates the need to undo wound-up leaders. By doing so, the invention significantly reduces the time and effort spent on rig setup, enhances the fishing experience, and maximizes the potential for successful catches.

In light of the devices disclosed in the known art, it is submitted that the present invention substantially diverges in design elements and methods from the known art and consequently it is clear that there is a need in the art for an improvement for a fishing rig storage device. In this regard the instant invention substantially fulfills these needs.

SUMMARY OF THE INVENTION

In view of the foregoing disadvantages inherent in the known types of fishing rig storage devices now present in the known art. The present invention provides a new fishing rig storage device wherein the same can be utilized for storing a plurality of assembled fishing rigs in an organized manner, ready for use.

It is an objective of the present invention to provide a fishing rig storage device comprising an upper cover, an opposing lower cover, and a middle section disposed therebetween, wherein the upper cover and the lower cover are pivotally secured to the middle section. A first compartment is formed from the upper cover and middle section, whereas a second compartment is formed from the lower cover and middle section. The first and second compartments are disposed in a stacked configuration to allow for compact storing of multiple assembled fishing rigs.

It is another objective of the present invention to provide a fishing rig storage device comprising a plurality of eyelet fasteners are disposed at a first end of the first compartment and a plurality of tensioning member are disposed at a second end, aligned with the eyelet fasteners. A retaining member is positioned between the first and second ends of the compartment and can receive a fishing hook.

It is another objective of the present invention to provide a fishing rig storage device that offers a novel and efficient solution to the challenges faced by anglers when it comes to lure and leader organization by allowing anglers to prepare and store pre-set lure and leader combinations in advance, saving valuable time on the water. This feature eliminates the need for anglers to tie knots or set up rigs on the spot, streamlining the preparation process.

It is yet another objective of the present invention to provide a fishing rig storage device configured to store fishing rigs under tension, promoting straightness and preventing tangling. This benefit addresses the issue of tangled and kinked leaders, reducing frustration and potential loss of fishing time. The present invention offers timesaving, efficient, and user-friendly features that address the common problems faced by anglers. By offering pre-set lure and leader combinations, maintaining tension for tangle-free storage, and allowing quick access to lures, this invention aims to enhance the overall fishing experience while increasing the likelihood of successful catches. Furthermore, the elimination of tangled and kinked leaders, as well as the straight connection to lures, ensures that the fishing rig storage device maximizes lure action for optimal fish attraction and capture.

It is therefore an object of the present invention to provide a new and improved fishing rig storage device, that has all of the advantages of the known art and none of the disadvantages.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
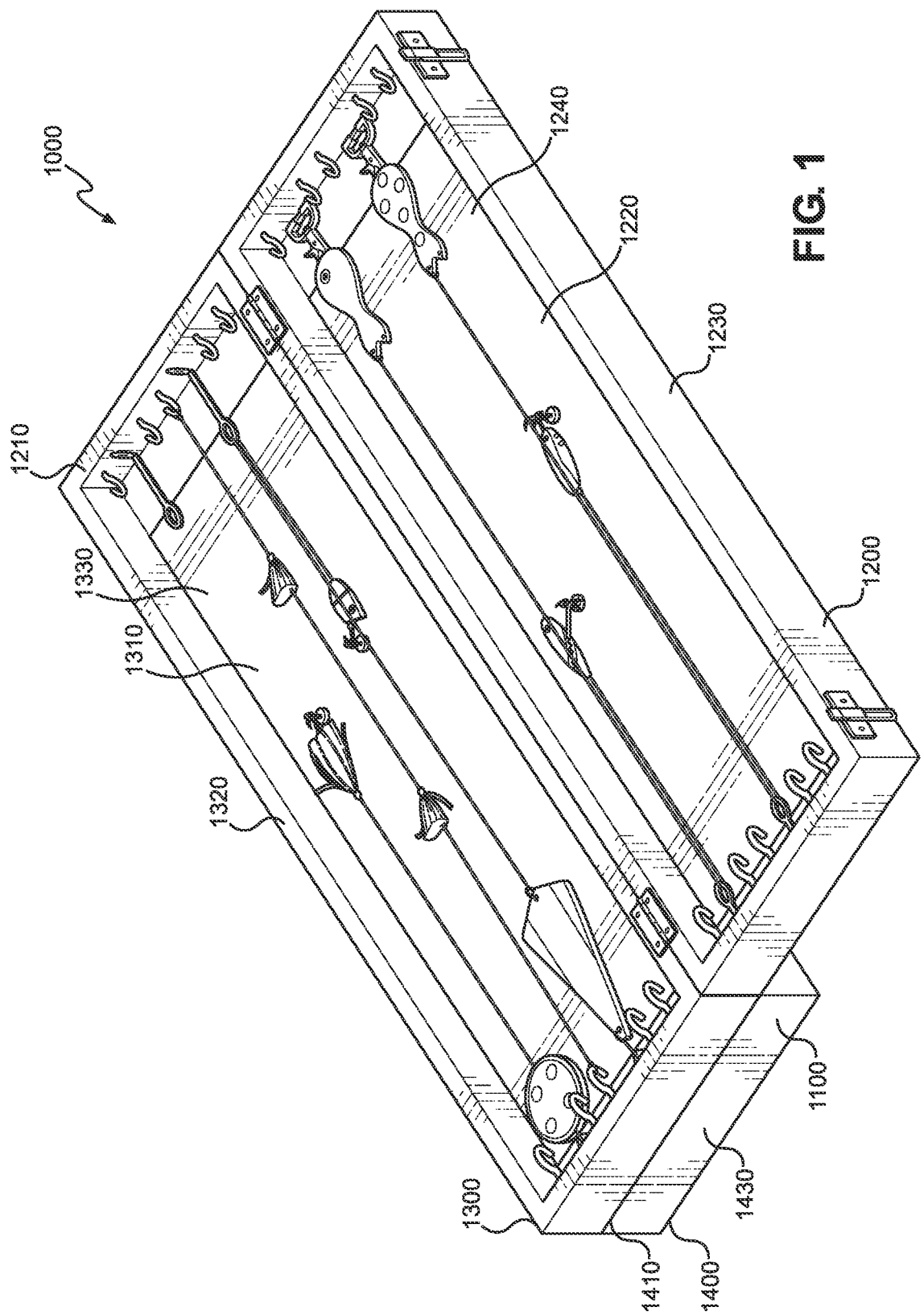
FIG. 1 shows a perspective view of an embodiment of the fishing rig storage device in an open configuration.

Reference is made herein to the attached drawings. Like reference numerals are used throughout the drawings to depict like or similar elements of the fishing rig storage devices. For the purposes of presenting a brief and clear description of the present invention, the embodiment discussed will be used for storing assembled fishing rigs. The figures are intended for representative purposes only and should not be considered to be limiting in any respect. Furthermore, the described features, structures, or characteristics may be combined in any suitable manner in one or more embodiments. In the following description, numerous specific details are provided to give a thorough understanding of embodiments.

Reference will now be made in detail to the exemplary embodiment(s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment" does not necessarily refer to the same embodiment.

Figure 2:
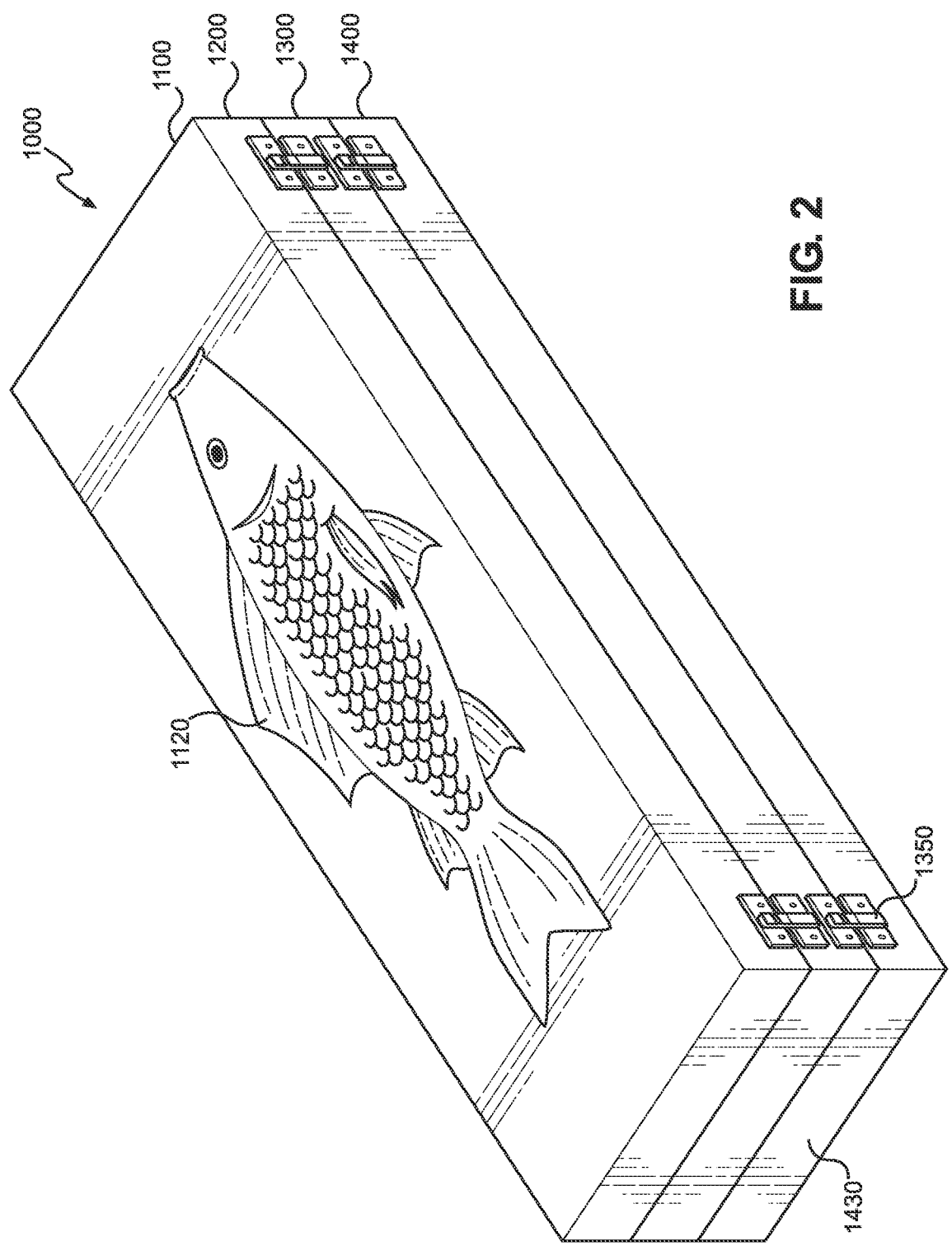
FIG. 2 shows a perspective view of an embodiment of the fishing rig storage device in a closed configuration.

Referring now to FIGS. 1 and 2, there is shown a perspective view of an embodiment of the fishing rig storage device in an open configuration and a closed configuration, respectively. In the illustrated embodiment, the fishing rig storage device 1000 comprises a housing 1100 having an upper cover 1200, an opposing lower cover 1400, and a middle section 1400 disposed. A first compartment 1210 is formed from the upper cover 1200 and the middle section 1300 and a second compartment 1410 is formed from the lower cover 1400 and the middle section 1300. In the illustrated embodiment, the first and second compartments 1210, 1410 are disposed in a stacked configuration and wherein an exterior perimeter of the first compartment is coplanar with an exterior perimeter of the second compartment. This provides for compact storage and convenient transportability. In some embodiments, the exterior perimeters of each compartment are not coplanar. In the illustrated embodiment, the housing 1100 comprises a rectangular cross-sectional shape. However, in alternate embodiments, the housing comprises any suitable cross-sectional shape. In some embodiments, the housing comprises an upper cover and a lower cover, without a middle section, forming a single compartment.

In the illustrated embodiment, the upper cover 1200 and the lower cover 1400 each have a base 1220 and a sidewall 1230, 1430 extending from the base forming a recess 1240. The recess 1240 is adapted to receive and store multiple fishing rigs in an assembled manner. The middle section 1300 comprises a base 1310 having a first sidewall 1320 extending perpendicularly from a perimeter thereof. In the illustrated embodiment, the sidewall 1320 extends from both an upper side and a lower side of the base, forming an upper recess 1330 in the first compartment and a lower recess in the second compartment. In some embodiments, the sidewall of the middle section only extends from one side, whereas in alternate embodiments, the middle section only comprises a base that joins with the upper and lower covers to form the first and second compartments.

The housing 1100 and compartments 1210, 1410 are movable between an open and closed configuration. In the illustrated embodiment, the upper cover 1200 and the lower cover 1400 are pivotally secured to the middle section 1300 via a hinge 1350. However, in alternate embodiments, the upper cover and lower cover are removably secured to the middle section or, in some embodiments, slidably secured to the base. In the illustrated embodiment, the upper and lower covers 1200, 1300 are adapted to rotate 180 degrees about the pivot to allow the fishing rigs disposed within the recesses to be easily accessible.

In some embodiments, an indicator 1120 is disposed on a surface of the housing 1100 to inform the user of the types of fishing rigs disposed within the housing. In alternate embodiments, the indicator can be a logo or other design.

Figure 3:
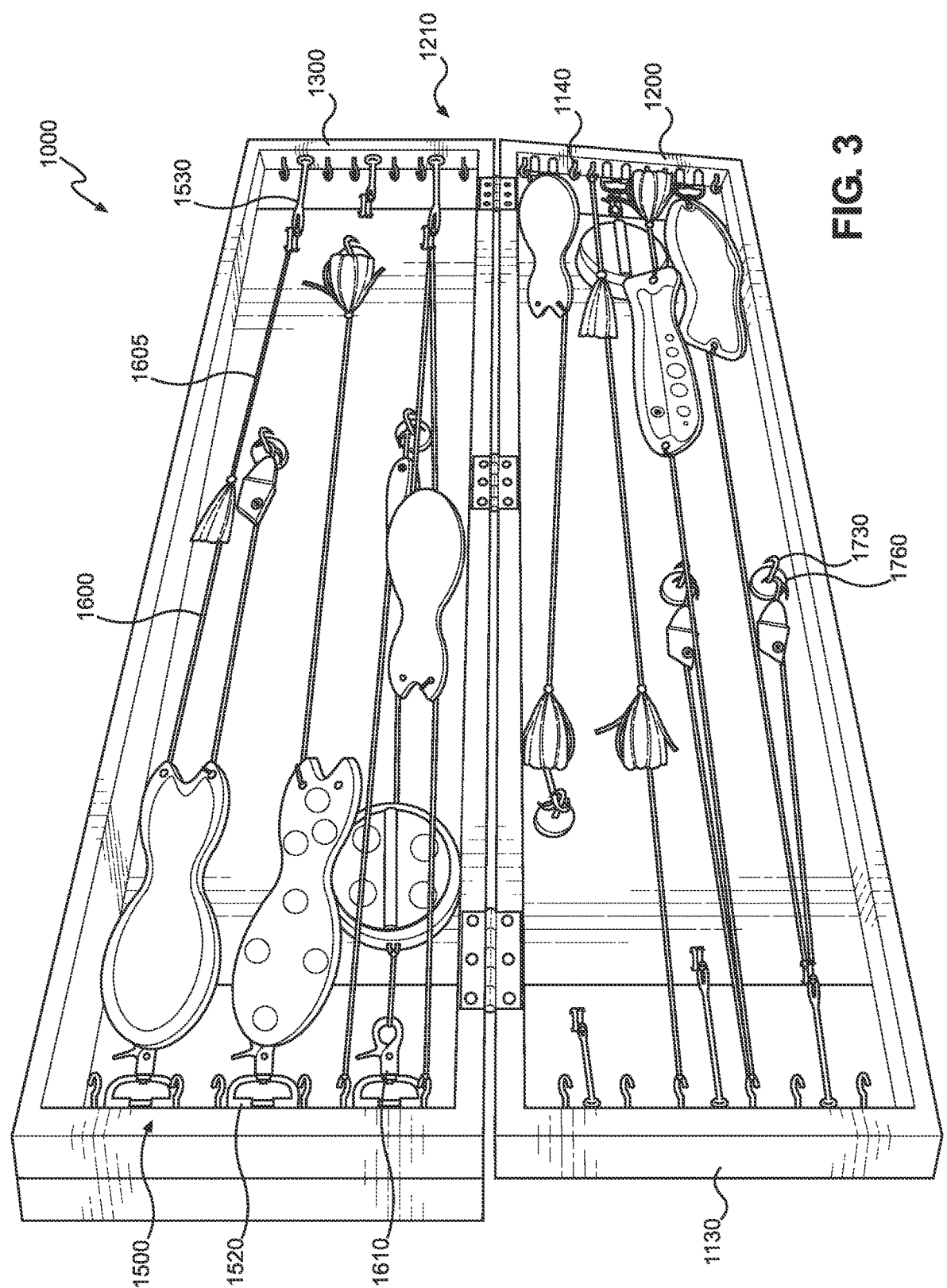
FIG. 3 shows a perspective view of a first compartment of an embodiment of the fishing rig storage device.
Figure 4:
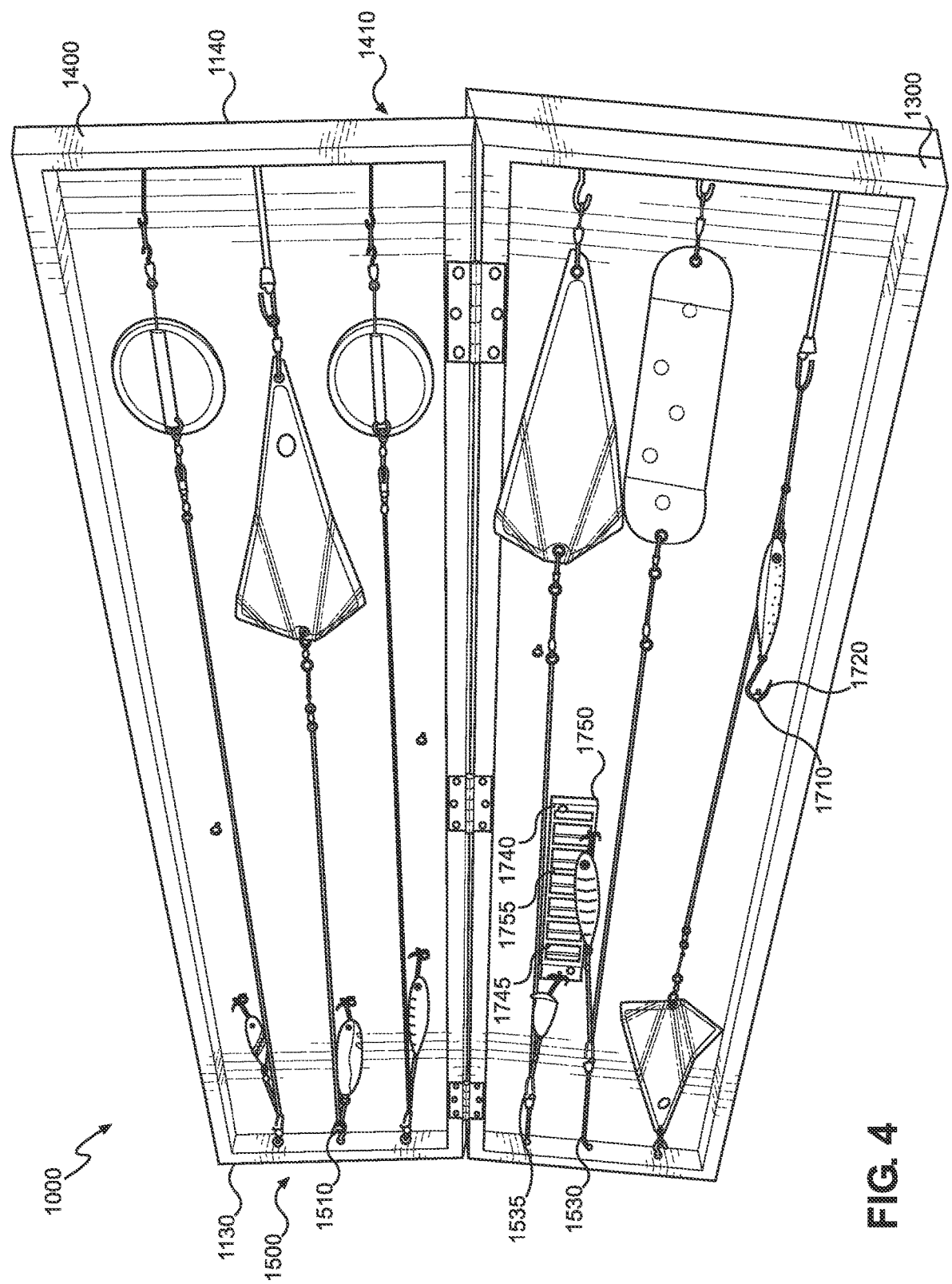
FIG. 4 shows a perspective view of a second compartment of an embodiment of the fishing rig storage device.

Referring now to FIGS. 3 and 4, there are shown a perspective views of a first compartment and a second compartment of an embodiment of the fishing rig storage device, respectively. At least the first or second compartment 1210, 1410 comprise a plurality of fasteners configured to maintain a fishing rig 1600 in an assembled configuration without becoming entangled with an adjacent assembled fishing rig. In the illustrated embodiment, the first and second compartments 1210, 1410 each comprise three fastener sets to maintain three fishing rig assemblies. Each fastener set 1500 comprises a set of open hook members 1510 disposed on a first end 1130 and an opposing second end 1140 of the housing 1100 and extending from an interior of the sidewall. In the shown embodiment, the set of open hook members 1510 comprise a pair of open hook members 1510. The open hook members 1510 are configured to receive a fishing line 1605 or leader of fishing rig assembly. The line can be wrapped around the open hook members 1510 as many times as needed depending on the length of the line to be stored. The purpose for a pair of open hook members on each side is to prevent the line from entangling with the other parts of the fishing rig stored therein, such as the flasher or lure.

In the illustrated embodiment, a closed catch 1520 is disposed between the pair of hook members 1510. The closed catch 1520 is configured to receive a clip 1610 of the fishing rig 1600, wherein the clip forms a portion of the fishing rig that is attached a flasher 1610 or similar object. In some embodiments, the closed catch 1520 comprises a D-shape and is secured to an interior of the sidewall via a pair of eyelet fasteners. However, in alternate embodiments, the closed catch 1520 extends directly from the sidewall.

A tensioning member 1530 is disposed on the second end 1140 of the housing 110, positioned between the pair of hook members. The tensioning member 1530 is configured to maintain tension in the line disposed around the hook members or attached to the catch 1520 to prevent tangles. In the illustrated embodiment, the tensioning member 1530 is elastic, but in alternate embodiments, the tensioning member is a spring. However, in other embodiments, the tensioning member is any suitable member configured to maintain tension in the line of the fishing rig. In the shown embodiment, the tensioning member 1530 extends from the interior of the sidewall and comprises an opening 1535 configured to receive the line 1605 through. The opening can be formed from an open or closed loop. The open loop allows the line to be easily placed therein. In the illustrated embodiment, the tensioning member 1530 is aligned with the catch 1520.

In the illustrated embodiment, a retaining member 1700 extends from the base of either the first compartment, second compartment, or middle section, wherein the retaining member is disposed between the first and second ends of the housing. The retaining member 1700 is configured to receive a fishing hook and to prevent the hook from moving within the housing 1100. In the illustrated embodiment, multiple different retaining members 1700 are included. A first retaining member 1710 comprises a protruding member to receive the fishing hook therearound and a stopper 1720 at an end of the protruding member to prevent the fishing hook from slipping off. A second retaining member is an eyelet hook that receives the fishing hook therethrough. A third retaining member 1730 is a magnetic fastener, wherein any of the retaining members are configured to have magnetic capabilities. A fourth retaining 1740 member is configured to receive fishing hooks at different lengths thereabout. The fourth retaining 1740 member comprises a plurality of openings 1745 disposed at fixed intervals therealong. The fourth retaining member comprises a pair of parallel cross-members 1750 joined by a plurality of crossbars 1755 that form the plurality of openings, wherein each crossbar is configured to receive the fishing hook.

The present invention allows pre-set lure combinations to be assembled prior to going out fishing. Various fishing rig or lure combinations are assembled and laid out in the housing to keep them tangle free and ready for use right away when fishing. Different compartments of the housing can hold in tension different types of fishing rig setups to easily attach to a predetermined rod. Changing out lure combinations within the different compartments is made easy as the fishing rig combination can be simply placed back into the compartment when not needed, and a new fishing rig combination can be removed from a different area or compartment of the housing. A user will have all the assembled or pre-set fishing rigs possibly needed for a day of fishing, as it can be unpredictable which type of fishing rig will be needed as it can be dependent on the type of fish and the environment in which the fisherman is fishing.

In some embodiments, the housing comprises different sizes, different shapes, and more than two compartments to accommodate multiple and differently sized pre-set fishing rigs. Different housing configurations and sizes allow for the different types of lure combinations for different types of fish and styles of fishing.

In some embodiments, the housing is configured to accommodate or comprises a pre-set fishing rig for catching salmon. In some embodiments, a pre-set fishing rig for salmon comprises a flasher, a leader and fly, a flasher, a leader and spoon or a combination of diver and lure. In some embodiments, a pre-set fishing rig for walleye comprise bottom bouncer weights and spinner. In some embodiments, a pre-set fishing rig for saltwater combination setups include a string of flies or squid and lure. In some embodiments, a pre-set fishing rig for musky/pike include large lures on a leader. The storage device can be a different size depending on the length and size of the pre-set fishing rigs.

The present invention allows a fisherman to set up a specific lure combination or fishing rig before going fishing, wherein each fishing rig will be ready to use right away rather than having to spend time finding everything, setting up each lure combination as needed, and wasting time in doing so.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:
1. A fishing rig storage device, comprising:
   a housing having an upper cover and a lower cover, wherein the upper cover rotates about a pivot relative to the lower cover;
   wherein the upper cover and the lower cover each have a base and a sidewall extending from the base;
   wherein the housing includes a fastener set, each fastener set comprising:
      a first set of open hook members disposed at a first end of the housing and a second set of open hook members disposed at an opposing second end of the housing, wherein the first and second sets of hook members are aligned and configured to receive a fishing line therearound;
      a catch disposed between two open hook members of the first set of open hook members, wherein the catch is configured to receive a clip from a fishing rig;
      a tensioning member disposed between two open hook members of the second set of open hook members, wherein the tensioning member is configured to maintain tension the fishing line;
   a retaining member extending from the base of the upper or lower cover and disposed between the first and second ends of the housing, wherein the retaining member is configured to receive and secure to a fishing hook extending from the fishing line;
   wherein the retaining member comprises a plurality of openings disposed at fixed intervals along the retaining member.

2. The fishing rig storage device of claim 1, further comprising a middle section disposed between the upper cover and the lower cover, wherein the upper cover and the lower cover are pivotally secured to the middle section.

3. The fishing rig storage device of claim 2, wherein the housing comprises a first compartment formed from the upper cover and the middle section and a second compartment formed from the lower cover and the middle section.

4. The fishing rig storage device of claim 3, wherein an exterior perimeter of the sidewall of the upper cover is coplanar with an exterior perimeter of the sidewall of the lower cover.

5. The fishing rig storage device of claim 3, wherein the first and second compartment each comprises three fastener sets.

6. The fishing rig storage device of claim 2, wherein the middle section comprises a base having a sidewall extending perpendicularly from a perimeter thereof.

7. The fishing rig storage device of claim 6, wherein the sidewall of the middle section extends from an upper side and a lower side of the base of the middle section.

8. The fishing rig storage device of claim 1, wherein the housing comprises a rectangular cross-sectional shape.

9. The fishing rig storage device of claim 1, wherein the tensioning member is a spring.

10. The fishing rig storage device of claim 1, wherein the tensioning member is elastic.

11. The fishing rig storage device of claim 1, wherein the retaining member is magnetic.

12. The fishing rig storage device of claim 1, wherein the retaining member comprises a pair of parallel crossmembers joined by a plurality of crossbars that form the plurality of openings, wherein each crossbar is configured to receive the fishing hook.

13. The fishing rig storage device of claim 1, wherein the upper and lower covers are adapted to rotate 180 degrees about the pivot.

14. The fishing rig storage device of claim 1, further comprising an indicia on a surface of the housing to indicate a type of fishing rig disposed within the housing.

15. The fishing rig storage device of claim 1, wherein the tensioning member and the catch are in alignment with one another.

16. The fishing rig storage device of claim 1, wherein the retaining member comprises a protruding member having a stopper at an end thereof.

17. A fishing rig storage device, comprising:
- a housing having an upper cover and a lower cover, wherein the upper cover rotates about a pivot relative to the lower cover;
- wherein the upper cover and the lower cover each have a base and a sidewall extending from the base;
- wherein the housing includes a fastener set, each fastener set comprising:
  - a first set of open hook members disposed at a first end of the housing and a second set of hook members disposed at an opposing second end of the housing, wherein the first and second sets of hook members are aligned and configured to receive a fishing line therearound;
  - a catch disposed between the first set of open hook members, wherein the catch is configured to receive a clip from a fishing rig;
  - a tensioning member disposed between the second set of open hook members, wherein
  - the tensioning member is configured to maintain tension the fishing line;
- a retaining member extending from the base of the upper or lower cover and disposed between the first and second ends of the housing, wherein the retaining member is configured to receive and secure to a fishing hook extending from the fishing line;
- wherein the retaining member comprises a protruding member having a stopper at an end thereof.

* * * * *